(12) United States Patent
Silverstein et al.

(10) Patent No.: US 11,146,601 B1
(45) Date of Patent: Oct. 12, 2021

(54) UNINTENDED SCREEN SHARE PREVENTION

(71) Applicant: International Business Machines Corporation, Armonk, NY (US)

(72) Inventors: Zachary A. Silverstein, Jacksonville, FL (US); Fang Lu, Billerica, MA (US); Clement Decrop, Arlington, VA (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/023,740

(22) Filed: Sep. 17, 2020

(51) Int. Cl.
   *H04L 29/06* (2006.01)
   *H04L 12/18* (2006.01)
   *G06Q 10/10* (2012.01)

(52) U.S. Cl.
   CPC .......... *H04L 65/403* (2013.01); *G06Q 10/10* (2013.01); *H04L 12/1827* (2013.01); *H04L 12/1831* (2013.01); *H04L 63/102* (2013.01)

(58) Field of Classification Search
   CPC ............ H04L 12/1827; H04L 12/1831; H04L 63/102; H04L 65/803; G06Q 10/10
   USPC ........................................................ 709/204
   See application file for complete search history.

(56) References Cited

U.S. PATENT DOCUMENTS

| | | | |
|---|---|---|---|
| 8,769,006 B2 | 7/2014 | Davidson et al. | |
| 9,001,180 B2 | 4/2015 | Calman et al. | |
| 10,521,607 B2 | 12/2019 | Agrawal et al. | |
| 10,586,071 B2 | 3/2020 | Kochura et al. | |
| 2013/0019186 A1 | 1/2013 | Lance et al. | |
| 2013/0151620 A1* | 6/2013 | Deshpande | ........... H04L 65/403 709/204 |
| 2014/0082485 A1 | 3/2014 | DeLuca et al. | |
| 2016/0234276 A1* | 8/2016 | Ouyang | ............... H04L 65/403 |
| 2017/0109519 A1 | 4/2017 | Sugaya | |
| 2017/0118271 A1* | 4/2017 | Reyes | ..................... H04L 67/06 |
| 2019/0163927 A1* | 5/2019 | Ura | ........................ G06F 40/151 |
| 2021/0051294 A1* | 2/2021 | Roedel | .................... G06T 5/002 |

OTHER PUBLICATIONS

"Contextual Split screen sharing method in online web conferencing", Disclosed Anonymously, An IP.com Prior Art Database Technical Disclosure, IP.com No. IPCOM000262834D, IP.com Electronic Publication Date: Jul. 6, 2020, 4 pages, <https://priorart.ip.com/IPCOM/000262834>.

(Continued)

*Primary Examiner* — Frantz B Jean
(74) *Attorney, Agent, or Firm* — Stephanie L. Carusillo

(57) ABSTRACT

In an approach to the prevention of unintentionally sharing content in a web conference, one or more computer processors detect a meeting initiation. One or more computer processors retrieve a corpus of information pertaining to the meeting. One or more computer processors detect a presenter in the meeting initiating a screen share of meeting content. One or more computer processors determine a context of the meeting content. One or more computer processors compare the corpus of information pertaining to the meeting to the context of the meeting content. One or more computer processors determine the context of the meeting content exceeds a threshold of similarity to the corpus of information pertaining to the meeting. One or more computer processors alert the presenter of dissimilar content.

20 Claims, 4 Drawing Sheets

(56) References Cited

OTHER PUBLICATIONS

"Method for easing the sharing of document with sensitive content in a video conference", Disclosed Anonymously, An IP.com Prior Art Database Technical Disclosure, IP.com No. IPCOM000261292D, IP.com Electronic Publication Date: Feb. 18, 2020, 4 pages, <https://priorart.ip.com/IPCOM/000261292>.

"Role-Based Mapping Rules Blur All or Parts of Shared Content Based on Cognitive Analysis", Disclosed Anonymously, An IP.com Prior Art Database Technical Disclosure, IP.com No. IPCOM000262057D, IP.com Electronic Publication Date: Apr. 28, 2020, 3 pages, <https://priorart.ip.com/IPCOM/000262057>.

* cited by examiner

UNINTENDED SCREEN SHARE PREVENTION

BACKGROUND OF THE INVENTION

The present invention relates generally to the field of computer-assisted conferencing and teleconferencing, and more particularly to the prevention of unintentionally sharing content in a web conference.

Meetings may be considered one of the most important activities in a business environment. Many organizations hold regular meetings as part of their routine operations. Delivering information, keeping colleagues and customers updated, discussing issues around team projects, assigning tasks, tracking progress, and making decisions are some of the reasons that meetings are an important part of professional activity. Meetings may be held in a variety of manners, including, but not limited to, in person, via teleconference, or via web conference.

Web conferencing is used as an umbrella term for various types of online conferencing and collaborative services including webinars ("web seminars"), webcasts, and web meetings. Web conferencing offers data streams of text-based messages, voice, and video chat to be shared simultaneously across geographically dispersed locations. Applications for web conferencing include meetings, training events, lectures, or presentations from a web-connected computer to other web-connected computers. Depending on the technology being used, participants may speak and listen to audio over standard telephone lines or via computer microphones and speakers. Some products allow for use of a webcam to display participants, as well as screen sharing capability for display of content from a participant's computer.

SUMMARY

Embodiments of the present invention disclose a computer-implemented method, a computer program product, and a system for the prevention of unintentionally sharing content in a web conference. The computer-implemented method includes one or more computer processors detecting a meeting initiation. One or more computer processors retrieve a corpus of information pertaining to the meeting. One or more computer processors detect a presenter in the meeting initiating a screen share of meeting content. One or more computer processors determine a context of the meeting content. One or more computer processors compare the corpus of information pertaining to the meeting to the context of the meeting content. One or more computer processors determine the context of the meeting content exceeds a threshold of similarity to the corpus of information pertaining to the meeting. One or more computer processors alert the presenter of dissimilar content.

DETAILED DESCRIPTION

Often, when participating in a web conference, a presenter can inadvertently share the wrong content displayed on the presenter's screen. For example, a user may have more than one display, and while the user intends to share the content displayed on monitor 1, the user accidentally shares the content displayed on monitor 2. This may be unfortunate, especially if the content displayed on monitor 2 is private, personal, or confidential. This situation can also impact the efficiency of the meeting, by slowing down the meeting. Embodiments of the present invention recognize that efficiency may be gained and privacy and security may be better maintained by providing a system that can analyze attributes of a meeting and attendees to determine whether the content intended to be shared by a presenter is relevant, and if not, then alert the presenter and prevent the screen sharing, thus, providing dynamic obfuscation management through subject matter and topic-based interaction in real-time. Embodiments of the present invention also recognize that privacy and security may be better maintained by providing a system that can detect a late arrival of an attendee of a web conference and determine if the attendee is authorized to view the content currently being shared. Implementation of embodiments of the invention may take a variety of forms, and exemplary implementation details are discussed subsequently with reference to the Figures.

Figure 1:
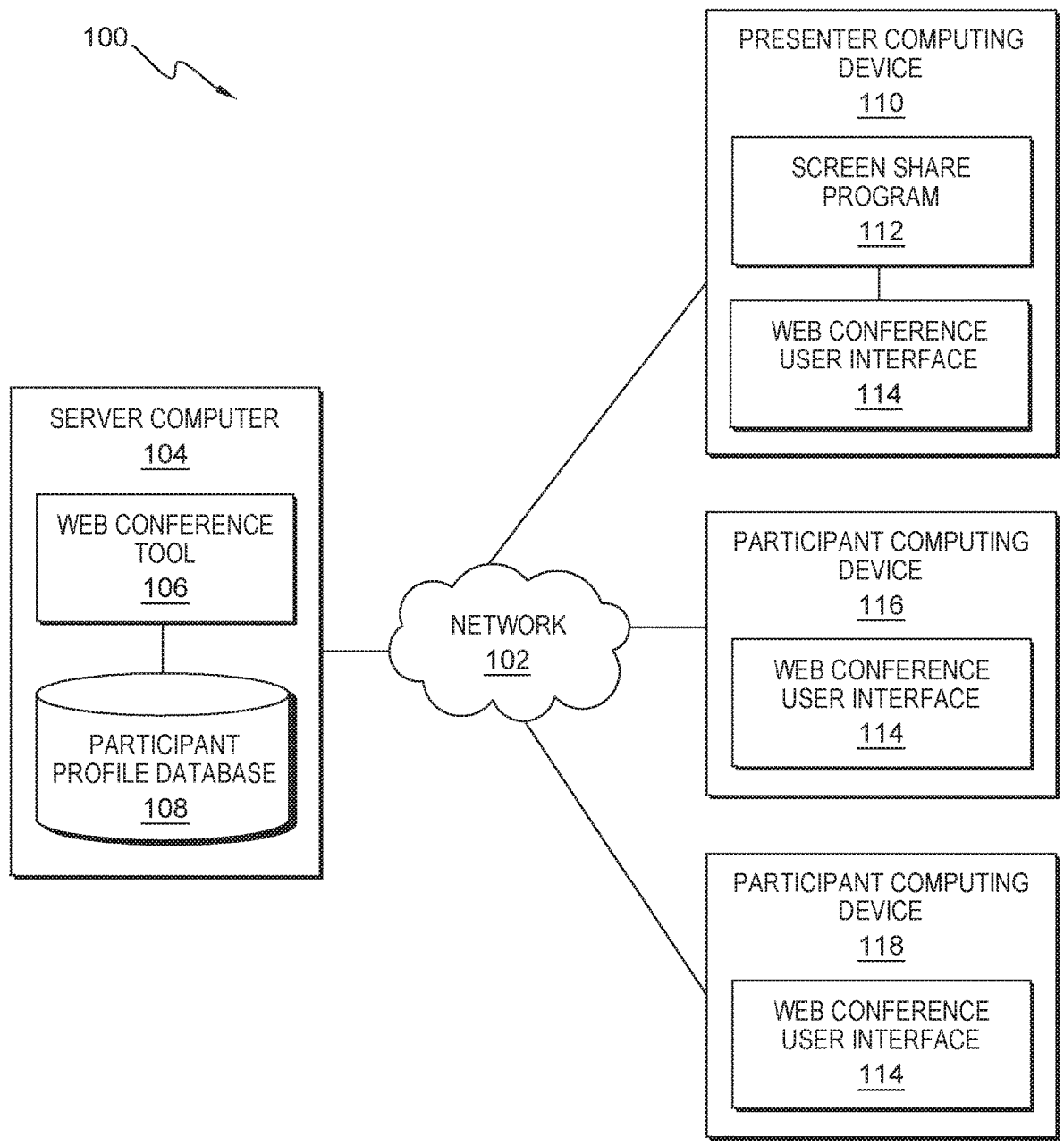
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, presenter computing device 110, participant computing device 116, and participant computing device 118, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, presenter computing device 110, participant computing device 116, participant computing device 118, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with presenter computing device 110, participant computing device 116, participant computing device 118, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes web conference tool 106 and participant profile database 108.

Web conference tool 106 is one of a plurality of available software packages or online services with which users can hold live meetings, conferencing, presentations, and training via the Internet, particularly on TCP/IP connections. Web conference tool 106 may be also known as online meeting software or, sometimes, simply video conferencing. Web conference tool 106 enables remote meetings based on Voice over Internet Protocol (VoIP), online video, instant messaging, file sharing, and screen sharing.

Participant profile database 108 stores information associated with participants of web conferences using web conference tool 106. In the depicted embodiment, participant profile database 108 resides on server computer 104. In another embodiment, participant profile database 108 may reside elsewhere within distributed data processing environment 100, provided screen share program 112 has access to participant profile database 108. A database is an organized collection of data. Participant profile database 108 can be implemented with any type of storage device capable of storing data and configuration files that can be accessed and utilized by screen share program 112, such as a database server, a hard disk drive, or a flash memory. Participant profile database 108 stores data associated with participants of web conferences, including, but not limited to, name, address, phone number, email address, social network affiliation, employer name, resume, job title, job role, etc. Participant profile database 108 may also store a company or organization directory of employees or members. Participant profile database 108 may also store meeting descriptions and distribution lists of meeting invitees or participants. Participant profile database 108 may also store user preferences for blocking screen sharing content.

The present invention may contain various accessible data sources, such as participant profile database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Screen share program 112 enables the authorized and secure processing of personal data. Screen share program 112 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Screen share program 112 provides information regarding personal data and the nature (e.g., type, scope, purpose, duration, etc.) of the processing. Screen share program 112 provides the user with copies of stored personal data. Screen share program 112 allows the correction or completion of incorrect or incomplete personal data. Screen share program 112 allows the immediate deletion of personal data.

Presenter computing device 110, participant computing device 116, and participant computing device 118 can each be one or more of a laptop computer, a tablet computer, a smart phone, a smart watch, a smart speaker, or any programmable electronic device capable of communicating with various components and devices within distributed data processing environment 100, via network 102. Presenter computing device 110, participant computing device 116, and participant computing device 118 may each be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, presenter computing device 110, participant computing device 116, and participant computing device 118 may each be integrated into a vehicle of the user. For example, presenter computing device 110, participant computing device 116, and participant computing device 118 may each include a heads-up display in the windshield of the vehicle. In general, presenter computing device 110, participant computing device 116, and participant computing device 118 each represents one or more programmable electronic devices or combination of programmable electronic devices capable of executing machine readable program instructions and communicating with other computing devices (not shown) within distributed data processing environment 100 via a network, such as network 102. Presenter computing device 110 includes screen share program 112. Presenter computing device 110, participant computing device 116, and participant computing device 118 each includes an instance of web conference user interface 114. Presenter computing device 110 may include internal and external hardware components, as depicted and described in further detail with respect to FIG. 4.

Screen share program 112 analyzes content shared in a web conference to determine whether the content is relevant to the meeting and meeting participants, and, if not, alerts the presenter. In the depicted embodiment, screen share program 112 resides on presenter computing device 110. In another embodiment, screen share program 112 may reside on server computer 104. In a further embodiment, screen share program 112 also reside on participant computing device 116, participant computing device 118, and any other computing devices within distributed data processing environment 100 (not shown), provided screen share program 112 has access to web conference tool 106, participant profile database 108, and any other devices from which users participate in web conferences, via network 102. In the depicted embodiment, screen share program 112 is a standalone program. In another embodiment, screen share program 112 may be integrated as a component of web conference tool 106.

Screen share program 112 detects a meeting initiation and retrieves information relevant to the meeting. Screen share program 112 detects a presenter in the meeting initiating a screen share. Screen share program 112 compares the screen share content to the meeting information and determines whether the content context is similar to the meeting information. If screen share program 112 determines the content context is not similar, then screen share program 112 blocks the screen share and alerts the presenter. Once screen share program 112 detects a corrective action by the presenter, screen share program 112 allows the screen share. In addition, once screen sharing begins, screen share program 112 detects a new meeting participant and retrieves additional meeting information. If screen share program 112 determines the new meeting participant is not included in the meeting information, then screen share program 112 blocks the screen share and alerts the presenter. Once screen share program 112 detects a corrective action by the presenter, screen share program 112 allows the screen share. Screen share program 112 is depicted and described in further detail with respect to FIG. 2 and FIG. 3.

Web conference user interface 114 provides an interface between web conference tool 106 on server computer 104 and a user of presenter computing device 110, participant computing device 116, and participant computing device 118. In one embodiment, web conference user interface 114 is mobile application software. Mobile application software, or an "app," is a computer program designed to run on smart phones, tablet computers and other mobile devices. In one embodiment, web conference user interface 114 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. Web conference user interface 114 enables a user of presenter computing device 110, participant computing device 116, and participant computing device 118 to participate in a web conference. Web conference user interface 114 also enables a presenter in a web conference, such as the user of presenter computing device 110, to share content displayed on a screen associated with presenter computing device 110 to other participants in a web conference. Further, web conference user interface 114 enables a presenter in a web conference to utilize the function of screen share program 112.

Figure 2:
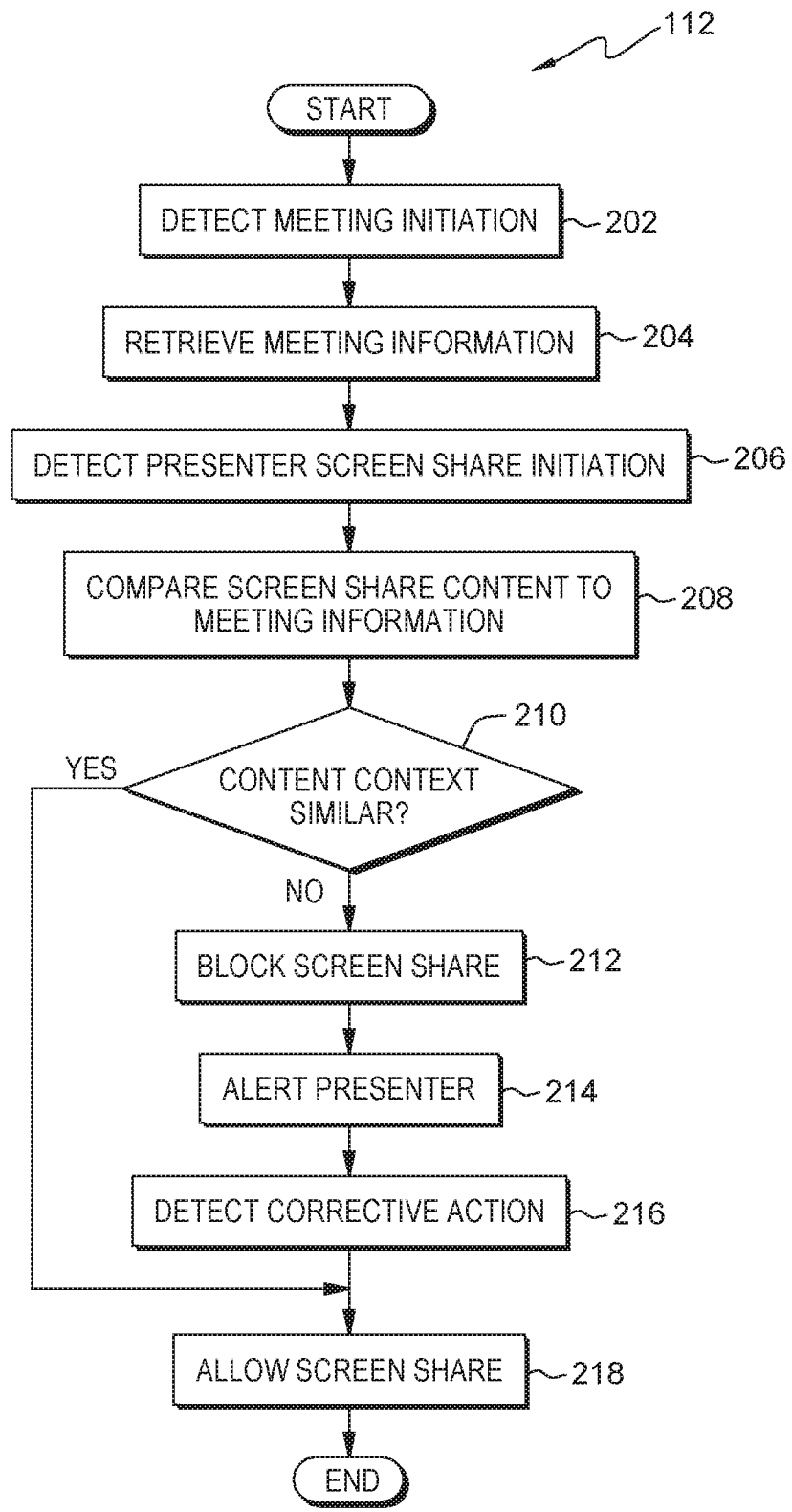
FIG. 2 is a flowchart depicting operational steps of a screen share program, on a computing device within the distributed data processing environment of FIG. 1, for preventing unintentionally sharing of content in a web conference, in accordance with an embodiment of the present invention.

FIG. 2 is a flowchart depicting operational steps of screen share program 112, on presenter computing device 110 within distributed data processing environment 100 of FIG. 1, for preventing unintentionally sharing of content in a web conference, in accordance with an embodiment of the present invention.

Screen share program 112 detects a meeting initiation (step 202). In an embodiment, when a user of presenter computing device 110, referred to herein as "the presenter," initiates a web conference meeting on web conference tool 106, via web conference user interface 114, screen share program 112 detects the meeting initiation. In one embodiment, screen share program 112 may detect the presenter clicking on a link in web conference user interface 114 to initiate the web conference. In another embodiment, screen share program 112 may detect the presenter sending a meeting notice, through web conference tool 106, an email application (not shown), or a calendaring application (not shown). In another embodiment, screen share program 112 may detect a meeting initiation when the presenter uploads a meeting agenda to web conference tool 106.

Screen share program 112 retrieves meeting information (step 204). In an embodiment, screen share program 112 retrieves information pertaining to the meeting and the meeting invitees. In one embodiment, screen share program 112 retrieves meeting information from participant profile database 108. In the embodiment, screen share program 112 retrieves information associated with the invitees and the presenter, or host, of the web conference. For example, screen share program 112 may retrieve an invitee's name, address, phone number, email address, social network affiliation, employer name, resume, job title, job role, and any other information which may be relevant to the meeting. In an embodiment, screen share program 112 retrieves information associated with the current attendees of the web conference. In an embodiment, screen share program 112 retrieves information specific to the meeting from one or more applications. For example, screen share program 112 may retrieve the meeting title, agenda, list of invitees, date, and time from the meeting notice in a calendaring application. In another example, screen share program 112 may retrieve data from a conversation between the presenter and an invitee about the meeting in an instant messaging application. In a further example, screen share program 112 may retrieve invitees' responses to the meeting notice from an email application. Screen share program 112 parses participant information from individuals who are expected and who have joined the web conference meeting. Screen share program 112 may process text using one or more textual analysis techniques, for example, a bag of words algorithm or topic analysis processing, to isolate and extract associated intents. Screen share program 112 combines the data retrieved from a plurality of locations into a corpus of meeting information.

Screen share program 112 detects a presenter screen share initiation (step 206). In one embodiment, screen share program 112 detects the presenter initiating a screen share when the presenter hovers a mouse pointer over a screen share button in web conference tool 106. In another embodiment, screen share program 112 may detect a screen share initiation when the presenter clicks the screen share button. In a further embodiment, screen share program 112 may detect a screen share initiation when the presenter pre-links documents the presenter plans to share just prior to or just after the meeting initiation. In yet another embodiment, screen share program 112 may detect a screen share initiation when the presenter utters a sentence regarding the screen share. For example, the presenter may say, via web conference user interface 114, "OK, let me share my screen," or "can you see the slides?" and screen share program 112 detects the statements via a microphone associated with presenter computing device 110 (not shown). In another embodiment, screen share program 112 may receive an indication from web conference tool 106 that the presenter is initiating a screen share. In one embodiment, the presenter may initiate sharing of one or more applications, via web conference user interface 114. In another embodiment, the presenter may initiate sharing of one or more entire screens, via web conference user interface 114.

Screen share program 112 compares the screen share content to the meeting information (step 208). In an embodiment, when the presenter intends to share an application or a full screen, as described above, screen share program 112 extracts the content from the intended screen share in order to compare the context of the content to the retrieved meeting information. For example, if the user intends to share information from a web page or browser, then screen share program 112 extracts HTML data. In another example, if the user intends to share information from a word processing application, then screen share program 112 extracts via a codec device to interpret digital signals. In yet another example, if the user intends to share information in one or more of various other formats, then screen share program 112 may utilize one or more optical character recognition (OCR) techniques to perform a live screen OCR transformation. Screen share program 112 extracts the core topics from the screen intended to be shared via, for example, topic analysis and a bag of words algorithm. In an embodiment, screen share program 112 uses one or more natural language processing (NLP) techniques to build out a dictionary for any topics mentioned. Screen share program 112 combines the data extracted from the intended screen share into a corpus of screen share content. Screen share program 112 compares the extracted screen share content corpus to the corpus of meeting information to measure a similarity between the two corpora. For example, screen share program 112 may use a cosine distance similarity technique, as would be recognized by a person of skill in the art, to measure similarity between the two corpora.

Screen share program 112 determines whether the context of the screen share content is similar to the meeting information (decision block 210). In an embodiment, based on the comparison, screen share program 112 determines whether the context of the screen share content exceeds a permitted threshold of similarity to the corpus of meeting information, i.e., the point at which screen share program 112 can determine the two corpora are referencing the same topic or information. In one embodiment, a system administrator sets the threshold. In another embodiment, a user of web conference tool 106 may set or edit the threshold. For example, a similarity threshold may be set to a percentage of similarity. In another example, if screen share program 112 used a cosine distance similarity technique, then a similarity threshold may be set to a distance value. For example, the meeting information corpus references "patent application." If screen share program 112 determines the screen share content corpus references "patent," then screen share program 112 may determine a 99% similarity, but if the screen share corpus references "application document," then screen share program 112 may determine a 56% similarity, while screen share program 112 may determine a reference to "vacation photos" is a 0% similarity. Screen share program 112 compares the similarity values to the permitted similarity threshold to determine whether the two corpora are similar. In an embodiment, screen share program 112 can account for the time of the meeting based on the agenda. For example, if the topic of the first 30 minutes of the meeting is different than the topic of the second 30 minutes, then screen share program 112 can determine, based on the time, whether the topic has changed, and therefore which screen share content is similar to the meeting information. In another embodiment, screen share program 112 can monitor the evolution of the conversation throughout the meeting and detect when a topic has changed. Upon detecting a topic change, screen share program 112 can dynamically change the corpus of meeting information in order to compare an updated corpus of meeting information that includes the new topic to the corpus of screen share content.

If screen share program 112 determines the context of the screen share content is not similar to the meeting information ("no" branch, decision block 210), then screen share program 112 blocks the screen share (step 212). In an embodiment, if screen share program 112 determines that a similarity value between the two corpora does not exceed a threshold, then screen share program 112 blocks, or prevents, the screen share. Continuing the previous example, if the threshold is set at 50%, then screen share program 112 determines the screen share reference of "application document," at 56% similarity, is similar enough to share. However, if the similarity threshold is set to 60%, then screen share program 112 blocks the screen share of the screen or application that includes the reference to "application document." In one embodiment, screen share program 112 blocks the entire screen. In another embodiment, screen share program 112 may only block the portion of the screen that contains the content deemed not to be similar. In one embodiment, screen share program 112 blocks the screen share by intercepting the screen share from web conference tool 106. In another embodiment, screen share program 112 blocks the screen share by obfuscating, i.e., blurring or blocking out, the text on the screen. In an embodiment where the screen share includes multiple applications, and screen share program 112 determines only the content of one of the applications does not exceed the similarity threshold, screen share program 112 can allow the screen share of the similar content and block the screen share of the one application displaying dissimilar content. In an embodiment, if the presenter has defined a preference, stored in participant profile database 108, that indicates any material marked as "confidential" or "private" should not be shared, then screen share program 112 can note whether the screen share content includes such a marking, and, if so, then screen share program 112 blocks the screen share.

Screen share program 112 alerts the presenter (step 214). In an embodiment, after blocking the screen share, screen share program 112 notifies the presenter that the context of the screen share content does not appear to match the topic, agenda, or participants of the meeting. In another embodiment, screen share program 112 may allow the screen share, but, at the same time, alert the presenter that the context of the screen share content does not appear to match the topic, agenda, or participants of the meeting. In one embodiment, screen share program 112 displays the alert on the screen of the presenter such that the other participants, such as the user of participant computing device 116, cannot see the message. In an embodiment, screen share program 112 includes an audible sound with the text alert to catch the attention of the presenter. In an embodiment, screen share program 112 may include a choice in the alert, such as asking the presenter if the screen should be shared and providing a "yes" and a "no" button for the presenter to click.

Screen share program 112 detects a corrective action (step 216). In an embodiment, screen share program 112 detects the presenter taking an action regarding the blocked screen share. For example, screen share program 112 may detect the presenter clicking a "yes" button in the notification to allow the screen to be shared and override the blocking. In another example, screen share program 112 may detect the user closing an application with irrelevant content. In a further example, screen share program 112 may detect the presenter saying, "now that we've covered the agenda, I want to show you my vacation photos."

Responsive to detecting the corrective action, or if screen share program 112 determines the context of the screen share content is similar to the meeting information ("yes" branch, decision block 210), then screen share program 112 allows the screen share (step 218). In an embodiment, once screen share program 112 is satisfied that the presenter authorizes the screen share, screen share program 112 allows web conference tool 106 to display the content of the screen share.

Figure 3:
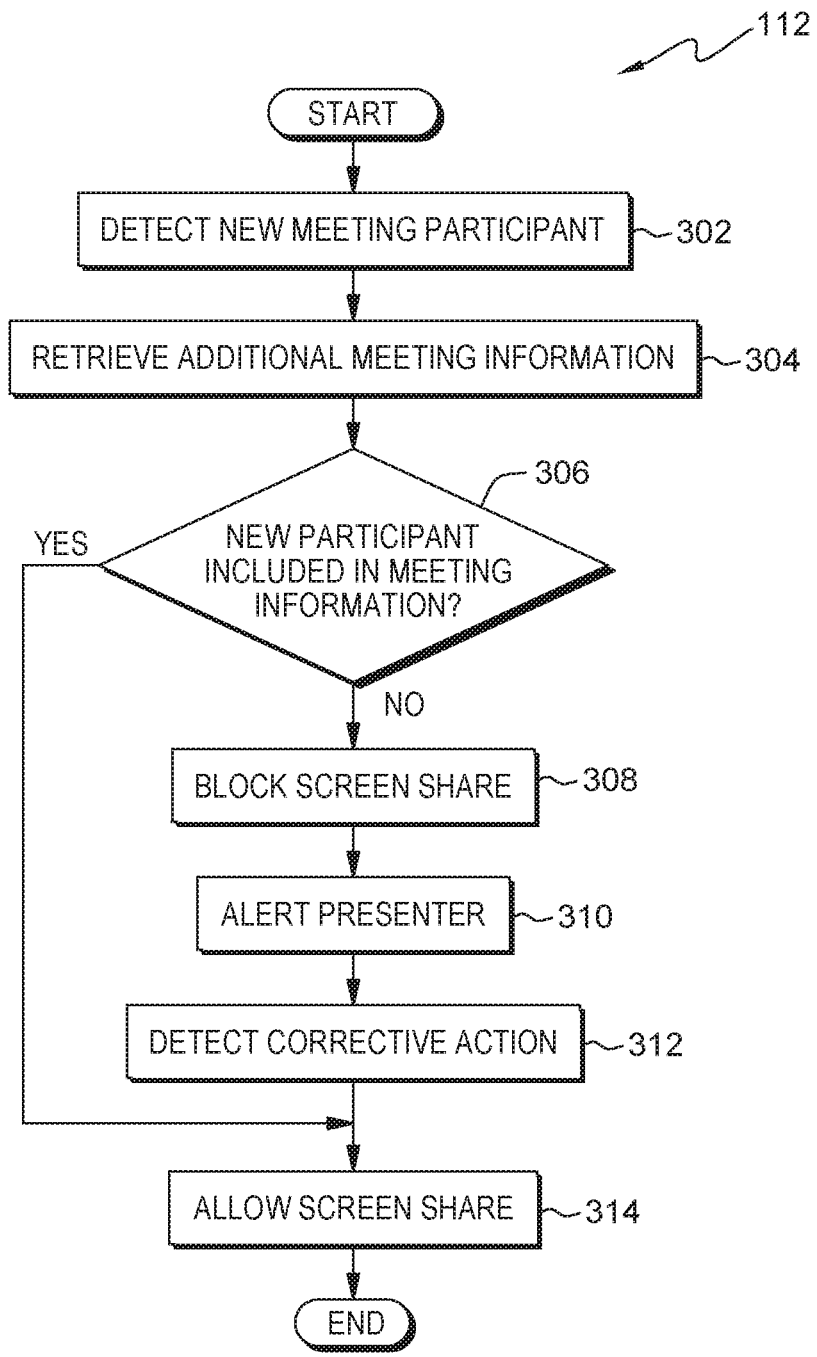
FIG. 3 is a flowchart depicting operational steps of the screen share program, on the computing device within the distributed data processing environment of FIG. 1, for determining whether a late participant is authorized to view shared content, in accordance with an embodiment of the present invention.

FIG. 3 is a flowchart depicting operational steps of screen share program 112, on presenter computing device 110 within distributed data processing environment 100 of FIG. 1, for determining whether a late participant is authorized to view shared content, in accordance with an embodiment of the present invention.

Screen share program 112 detects a new participant (step 302). In an embodiment where the meeting has already started and the presenter is sharing content from a screen, screen share program 112 detects a new participant, such as the user of participant computing device 118, entering the web conference, via web conference user interface 114.

Screen share program 112 retrieves additional meeting information (step 304). In an embodiment, screen share program 112 retrieves meeting information, specific to the new participant, in addition to the corpus of meeting information already retrieved, as discussed with respect to step 204 of FIG. 2. For example, if screen share program 112 previously retrieved meeting information associated with current attendees of the meeting, then screen share program 112 retrieves similar meeting information associated with the new participant, such as a job role, resume, or employer of the new participant.

Screen share program 112 determines whether the new participant is included in the meeting information (decision block 306). In an embodiment, screen share program 112 adds the additional meeting information to the corpus of meeting information and determines whether the new participant is included in any of the meeting information. For example, screen share program 112 determines whether the new participant was on the invitee list. In another example, screen share program 112 may determine whether a job title or job role is associated with a meeting topic on the meeting agenda.

If screen share program 112 determines the new participant is not included in the meeting information ("no" branch, decision block 306), then screen share program 112 blocks the screen share (step 308). In an embodiment where screen share program 112 determines, based on the meeting information, that the new participant is not authorized to view the content of the current screen share, screen share program 112 blocks the screen share, as discussed with respect to step 212 of FIG. 2. For example, if screen share program 112 determines the new participant is joining the web conference from a connection external to the company of the presenter, then screen share program 112 blocks the screen share.

Screen share program 112 alerts the presenter (step 310). In an embodiment, as discussed with respect to step 214 of FIG. 2, after blocking the screen share, screen share program 112 notifies the presenter that the new participant does not appear to be authorized to view the context of the screen share content. In another embodiment, screen share program 112 may allow the screen share, but, at the same time, alert the presenter that the new participant does not appear to be authorized to view the context of the screen share content. For example, screen share program 112 may display a message saying, "A new internal participant has joined the meeting. Continue screen share?" In another example, screen share program 112 may display a message saying, "Add the new participant to the meeting invitee list?"

Screen share program 112 detects a corrective action (step 312). In an embodiment, as discussed with respect to step 216 of FIG. 2, screen share program 112 detects the presenter taking an action regarding the blocked screen share. For example, screen share program 112 may detect the presenter welcoming the new participant, via speech recognition. In another example, screen share program 112 may detect the presenter adding the new participant to the meeting attendee list or to the meeting agenda. In a further example, screen share program 112 may detect the new participant dropping off of the call, either with or without the presenter asking the new participant to do so. In yet another example, screen share program 112 may detect the presenter changing the content of the screen share.

Responsive to detecting the corrective action, or if screen share program 112 determines the new participant in the meeting is included in the meeting information ("yes" branch, decision block 306), then, as discussed with respect to step 218 of FIG. 2, screen share program 112 allows the screen share (step 314). For example, if screen share program 112 determines the new participant is on the invitee list, and is just late to the meeting, then screen share program 112 allows the screen share.

Figure 4:
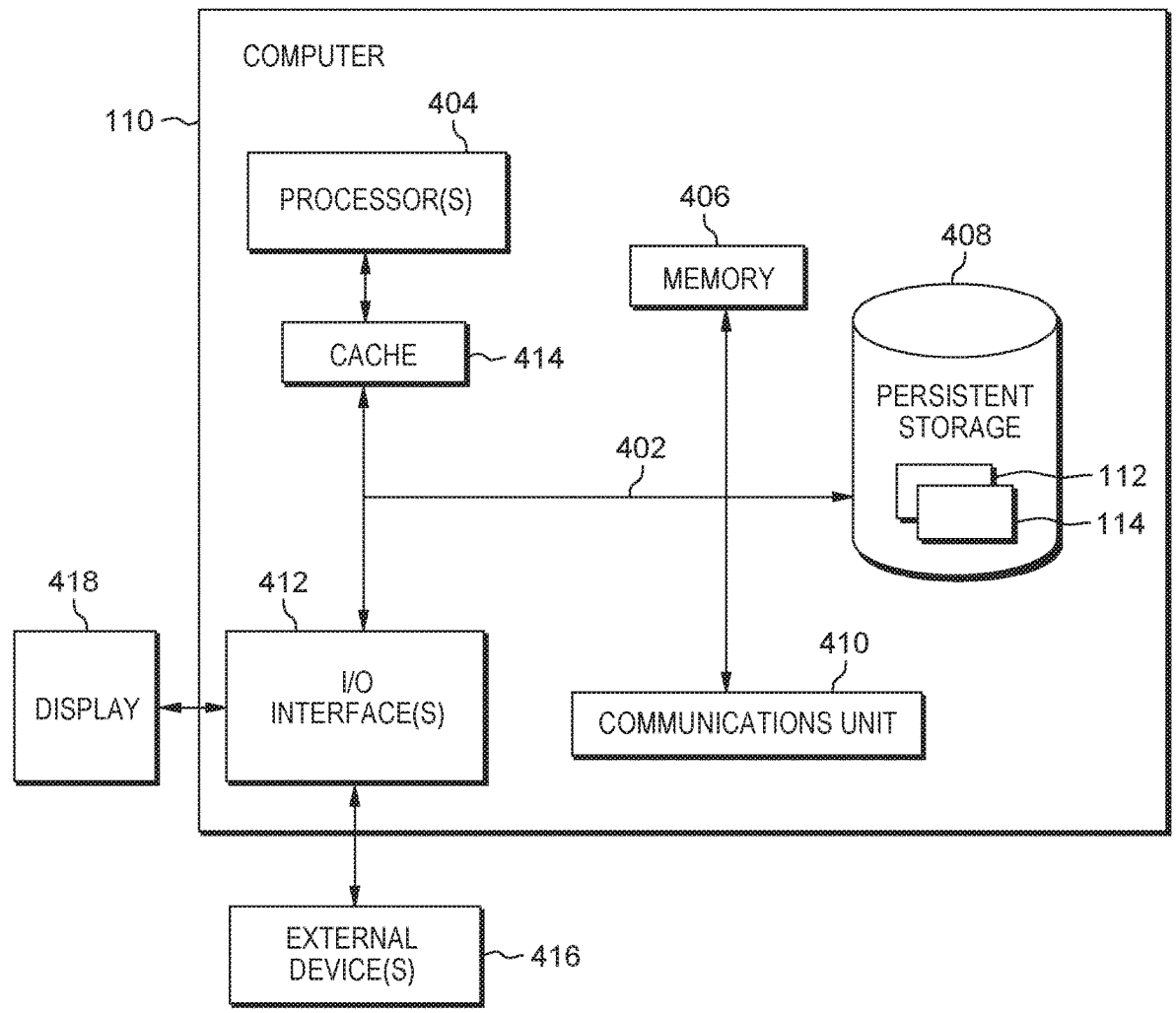
FIG. 4 depicts a block diagram of components of the computing device executing the screen share program within the distributed data processing environment of FIG. 1, in accordance with an embodiment of the present invention.

FIG. 4 depicts a block diagram of components of presenter computing device 110 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Presenter computing device 110 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., screen share program 112 and web conference user interface 114, are stored in persistent storage 408 for execution and/or access by one or more of the respective processor(s) 404 of presenter computing device 110 via cache 414. In this embodiment, persistent storage 408 includes a magnetic hard disk drive.

Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of presenter computing device 110, participant computing device 116, and participant computing device 118. In these examples, communications unit 410 includes one or more network interface cards. Communications unit 410 may provide communications through the use of either or both physical and wireless communications links. Screen share program 112, web conference user interface 114, and other programs and data used for implementation of the present invention, may be downloaded to persistent storage 408 of presenter computing device 110 through communications unit 410.

I/O interface(s) 412 allows for input and output of data with other devices that may be connected to presenter computing device 110. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., screen share program 112 and web conference user interface 114 on presenter computing device 110, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    detecting, by one or more computer processors, a meeting initiation;
    retrieving, by one or more computer processors, a corpus of information pertaining to the meeting;
    detecting, by one or more computer processors, a presenter in the meeting initiating a screen share of screen share content;
    determining, by one or more computer processors, a context of the screen share content;
    comparing, by one or more computer processors, the corpus of information pertaining to the meeting to the context of the screen share content;
    determining, by one or more computer processors, the context of the screen share content does not exceed a threshold of similarity to the corpus of information pertaining to the meeting; and
    alerting, by one or more computer processors, the presenter of dissimilar content.

2. The computer-implemented method of claim 1, further comprising:
    responsive to determining the context of the screen share content does not exceed a threshold of similarity to the corpus of information pertaining to the meeting, blocking, by one or more computer processors, the screen share.

3. The computer-implemented method of claim 2, further comprising:
    detecting, by one or more computer processors, a corrective action performed by the presenter; and
    allowing, by one or more computer processors, the screen share.

4. The computer-implemented method of claim 1, further comprising:
    detecting, by one or more computer processors, a meeting participant joining the meeting during the screen share;
    retrieving, by one or more computer processors, additional meeting information, wherein the additional meeting information includes information about the meeting participant;
    determining, by one or more computer processors, whether the additional meeting information is included in the corpus of information pertaining to the meeting; and
    responsive to determining the additional meeting information is not included in the corpus of information pertaining to the meeting, alerting, by one or more computer processors, the presenter to the meeting participant.

5. The computer-implemented method of claim 4, further comprising:
    responsive to determining the additional meeting information is not included in the corpus of information pertaining to the meeting, blocking, by one or more computer processors, the screen share.

6. The computer-implemented method of claim 1, wherein the corpus of information pertaining to the meeting includes at least one of: a name of an invitee, an address of an invitee, a phone number of an invitee, an email address of an invitee, a social network affiliation of an invitee, an employer name of an invitee, a resume of an invitee, a job title of an invitee, a job role of an invitee, a meeting title, a meeting agenda, list of invitees to the meeting, a date of the meeting, a time of the meeting, and a response to a meeting notice from an invitee.

7. The computer-implemented method of claim 1, wherein the threshold of similarity is a distance value based on a cosine distance similarity technique.

8. A computer program product comprising:
one or more computer readable storage media and program instructions collectively stored on the one or more computer readable storage media, the stored program instructions comprising:
program instructions to detect a meeting initiation;
program instructions to retrieve a corpus of information pertaining to the meeting;
program instructions to detect a presenter in the meeting initiating a screen share of screen share content;
program instructions to determine a context of the screen share content;
program instructions to compare the corpus of information pertaining to the meeting to the context of the screen share content;
program instructions to determine the context of the screen share content does not exceed a threshold of similarity to the corpus of information pertaining to the meeting; and
program instructions to alert the presenter of dissimilar content.

9. The computer program product of claim 8, the stored program instructions further comprising:
responsive to determining the context of the screen share content does not exceed a threshold of similarity to the corpus of information pertaining to the meeting, program instructions to block the screen share.

10. The computer program product of claim 9, the stored program instructions further comprising:
program instructions to detect a corrective action performed by the presenter; and
program instructions to allow the screen share.

11. The computer program product of claim 8, the stored program instructions further comprising:
program instructions to detect a meeting participant joining the meeting during the screen share;
program instructions to retrieve additional meeting information, wherein the additional meeting information includes information about the meeting participant;
program instructions to determine whether the additional meeting information is included in the corpus of information pertaining to the meeting; and
responsive to determining the additional meeting information is not included in the corpus of information pertaining to the meeting, program instructions to alert the presenter to the meeting participant.

12. The computer program product of claim 11, the stored program instructions further comprising:
responsive to determining the additional meeting information is not included in the corpus of information pertaining to the meeting, program instructions to block the screen share.

13. The computer program product of claim 8, wherein the corpus of information pertaining to the meeting includes at least one of: a name of an invitee, an address of an invitee, a phone number of an invitee, an email address of an invitee, a social network affiliation of an invitee, an employer name of an invitee, a resume of an invitee, a job title of an invitee, a job role of an invitee, a meeting title, a meeting agenda, list of invitees to the meeting, a date of the meeting, a time of the meeting, and a response to a meeting notice from an invitee.

14. The computer program product of claim 8, wherein the threshold of similarity is a distance value based on a cosine distance similarity technique.

15. A computer system comprising:
one or more computer processors;
one or more computer readable storage media;
program instructions collectively stored on the one or more computer readable storage media for execution by at least one of the one or more computer processors, the stored program instructions comprising:
program instructions to detect a meeting initiation;
program instructions to retrieve a corpus of information pertaining to the meeting;
program instructions to detect a presenter in the meeting initiating a screen share of screen share content;
program instructions to determine a context of the screen share content;
program instructions to compare the corpus of information pertaining to the meeting to the context of the screen share content;
program instructions to determine the context of the screen share content does not exceed a threshold of similarity to the corpus of information pertaining to the meeting; and
program instructions to alert the presenter of dissimilar content.

16. The computer system of claim 15, the stored program instructions further comprising:
responsive to determining the context of the screen share content does not exceed a threshold of similarity to the corpus of information pertaining to the meeting, program instructions to block the screen share.

17. The computer system of claim 16, the stored program instructions further comprising:
program instructions to detect a corrective action performed by the presenter; and
program instructions to allow the screen share.

18. The computer system of claim 15, the stored program instructions further comprising:
program instructions to detect a meeting participant joining the meeting during the screen share;
program instructions to retrieve additional meeting information, wherein the additional meeting information includes information about the meeting participant;
program instructions to determine whether the additional meeting information is included in the corpus of information pertaining to the meeting; and
responsive to determining the additional meeting information is not included in the corpus of information pertaining to the meeting, program instructions to alert the presenter to the meeting participant.

19. The computer system of claim 18, the stored program instructions further comprising:
responsive to determining the additional meeting information is not included in the corpus of information pertaining to the meeting, program instructions to block the screen share.

20. The computer system of claim 15, wherein the corpus of information pertaining to the meeting includes at least one of: a name of an invitee, an address of an invitee, a phone number of an invitee, an email address of an invitee, a social network affiliation of an invitee, an employer name of an invitee, a resume of an invitee, a job title of an invitee, a job role of an invitee, a meeting title, a meeting agenda, list of invitees to the meeting, a date of the meeting, a time of the meeting, and a response to a meeting notice from an invitee.

* * * * *